US011595900B2

(12) United States Patent
Xiao et al.

(10) Patent No.: US 11,595,900 B2
(45) Date of Patent: Feb. 28, 2023

(54) CONTROLLING A MODE OF OPERATION OF AN ELECTRONIC DEVICE

(71) Applicant: ARRIS Enterprises LLC, Suwanee, GA (US)

(72) Inventors: Jing Xiao, Guangdong (CN); Wei Lu, Guangdong (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 141 days.

(21) Appl. No.: 17/297,074

(22) PCT Filed: Aug. 5, 2020

(86) PCT No.: PCT/CN2020/107041
§ 371 (c)(1),
(2) Date: May 26, 2021

(87) PCT Pub. No.: WO2022/027297
PCT Pub. Date: Feb. 10, 2022

(65) Prior Publication Data
US 2022/0312331 A1    Sep. 29, 2022

(51) Int. Cl.
*H04W 52/02* (2009.01)
*G06F 1/32* (2019.01)
*H04W 76/25* (2018.01)

(52) U.S. Cl.
CPC ....... *H04W 52/0258* (2013.01); *H04W 76/25* (2018.02)

(58) Field of Classification Search
CPC ............. H04W 52/0258; H04W 76/25; H04W 52/0216; H04W 52/02; H04W 84/02;
(Continued)

(56) References Cited

U.S. PATENT DOCUMENTS 7,920,531 B2 * 4/2011 Gupta .................... H04L 41/00
370/338
9,380,444 B2 * 6/2016 Gupta ................... H04W 74/08
(Continued)

FOREIGN PATENT DOCUMENTS

CN      108347458      7/2018
WO    2016/096679     6/2016

OTHER PUBLICATIONS

International Search Report and Written Opinion of the International Searching Authority dated Apr. 26, 2021 in International (PCT) Application No. PCT/CN2020/107041.

*Primary Examiner* — Andrew Wendell
(74) *Attorney, Agent, or Firm* — Wenderoth, Lind & Ponack, L.L.P.

(57) ABSTRACT

A modem/gateway device is provided that includes a network interface configured to connect to and communicate with local area network (LAN) clients and Wi-Fi clients, a non-transitory memory configured to store instructions, and a hardware processor. The hardware processor is configured to execute the instructions to monitor a connection status of the LAN clients and Wi-Fi clients connected to the network interface, and compare the connected LAN clients against a LAN client list and the connected Wi-Fi clients against a Wi-Fi client list. The mode of operation of the electronic device is controlled to be in a power savings mode when none of the connected LAN or none of the connected Wi-Fi clients is on the respective LAN or Wi-Fi client list, and is controlled to be in a normal power mode when any of the connected LAN or Wi-Fi clients is on the respective LAN or Wi-Fi client list.

21 Claims, 6 Drawing Sheets

(58) Field of Classification Search
CPC .... H04B 1/005; H04B 7/0693; H04B 7/0877; G06F 1/3278; G06F 1/3209
See application file for complete search history.

(56) References Cited

U.S. PATENT DOCUMENTS

| | | |
|---|---|---|
| 11,122,083 B1* | 9/2021 | Quevedo ............ H04L 63/0236 |
| 2011/0126035 A1 | 5/2011 | Kaneko |
| 2012/0008535 A1 | 1/2012 | Kuehnel |
| 2012/0198221 A1* | 8/2012 | Tukol ..................... G06F 8/658 |
| | | 713/2 |
| 2012/0233679 A1* | 9/2012 | Shedrinsky ............ A61B 5/002 |
| | | 726/7 |
| 2014/0192691 A1* | 7/2014 | Vyas ...................... H04W 4/06 |
| | | 370/312 |
| 2017/0181199 A1* | 6/2017 | Agarwal ............ H04W 74/002 |
| 2017/0201942 A1* | 7/2017 | Mathews .......... H04M 1/72412 |
| 2018/0054799 A1* | 2/2018 | Starsinic ........... H04W 52/0225 |
| 2019/0386852 A1* | 12/2019 | Zhao ..................... H04W 4/80 |

* cited by examiner

| WiFi CLIENT TABLE ~33 | | | | |
|---|---|---|---|---|
| 34 CLIENT DEVICE | 35 STATUS | | 36 MAC ADDRESS | SSID 37 |
| | CONNECTED | DISCONNECTED | | |
| Wi-Fi-CPE5 | X | | 00:1A:C2:B7:00:47 | FAM |
| SMARTPHONE | X | | F2:36:B2:14:R1:45 | FAM |
| LAPTOP | | X | 01:00:C7:10:33:P1 | FAM |
| TABLET | X | | 02:00:C9:10:15:P8 | FAM |
| TV | X | | 01:XX:E7:10:55:P1 | FAM |

*FIG. 3A*

| WiFi CLIENT TABLE ~33 | | | | |
|---|---|---|---|---|
| 34 CLIENT DEVICE | 35 STATUS | | 36 MAC ADDRESS | SSID 37 |
| | CONNECTED | DISCONNECTED | | |
| Wi-Fi-CPE5 | | X | 00:1A:C2:B7:00:47 | FAM |
| SMARTPHONE | | X | F2:36:B2:14:R1:45 | FAM |
| LAPTOP | | X | 01:00:C7:10:33:P1 | FAM |
| TABLET | | X | 02:00:C9:10:15:P8 | FAM |
| TV | | X | 01:XX:E7:10:55:P1 | FAM |

*FIG. 3B*

| WiFi CLIENT TABLE ~33 | | | | | |
|---|---|---|---|---|---|
| 34 CLIENT DEVICE | 35 STATUS | | 36 MAC ADDRESS | SSID 37 | 37A SUB NETWORK |
| | CONNECTED | DISCONNECTED | | | |
| Wi-Fi-CPE5 | | X | 00:1A:C2:B7:00:47 | FAM | HOME |
| SMARTPHONE | | X | F2:36:B2:14:R1:45 | FAM | HOME |
| LAPTOP | | X | 01:00:C7:10:33:P1 | FAM | HOME |
| TABLET | | X | 02:00:C9:10:15:P8 | FAM | HOME |
| TV | | X | 01:XX:E7:10:55:P1 | FAM | HOME |
| SMARTPHONE2 | X | | 02:CM:CD:12:10:12 | FRIEND | GUEST |
| UNKNOWN | X | | 15:PM:CD:10:10:17 | GADGET | IoT |

*FIG. 3C*

LAN CLIENT TABLE — 38

| 39 CLIENT | 40 STATUS | | 41 MAC ADDRESS | SSID 42 | SUB 42A NETWORK |
|---|---|---|---|---|---|
| | CONNECTED | DISCONNECTED | | | |
| ETHERNET | X | | 00:00:AA:00:00:01 | | BACKHAUL |
| MoCA | | X | 00:00:AB:10:00:00 | | BACKHAUL |
| USB | X | | 00:00:AC:00:01:00 | | GUEST |
| Wi-Fi | X | | K5:12:AC:TR:01:00 | FAM | HOME |

*FIG. 4A*

LAN CLIENT TABLE — 38

| 39 CLIENT | 40 STATUS | | 41 MAC ADDRESS | SSID 42 | SUB 42A NETWORK |
|---|---|---|---|---|---|
| | CONNECTED | DISCONNECTED | | | |
| ETHERNET | | X | 00:00:AA:00:00:01 | | BACKHAUL |
| MoCA | | X | 00:00:AB:10:00:00 | | BACKHAUL |
| USB | | X | 00:00:AC:00:01:00 | | GUEST |
| Wi-Fi | | X | K5:12:AC:TR:01:00 | FAM | HOME |

*FIG. 4B*

LAN CLIENT TABLE — 38

| 39 CLIENT | 40 STATUS | | 41 MAC ADDRESS | SSID 42 | SUB 42A NETWORK |
|---|---|---|---|---|---|
| | CONNECTED | DISCONNECTED | | | |
| ETHERNET | | X | 00:00:AA:00:00:01 | | BACKHAUL |
| MoCA | | X | 00:00:AB:10:00:00 | | BACKHAUL |
| USB | | X | 00:00:AC:00:01:00 | | GUEST |
| Wi-Fi | | X | K5:12:AC:TR:01:00 | FAM | HOME |
| Wi-Fi-2 | X | | 00:07:XY:RQ:A0:04 | FRIEND | GUEST |
| Wi-Fi-3 | X | | K9:03:MN:I9:33:40 | GADGET | IoT |

*FIG. 4C*

WHITELIST CLIENT TABLE — 43

| 44 CLIENTS | 45 STATUS | | 46 MAC ADDRESS | SSID 47 | SUB 42A NETWORK |
|---|---|---|---|---|---|
| | CONNECTED | DISCONNECTED | | | |
| AIR CONDITIONER | X | | 01:2Z:C9:K2:01:97 | FAM | HOME |
| THERMOSTAT | X | | G3:37:K2:41:Q2:90 | FAM | HOME |
| REFRIGERATOR | X | | 00:07:IJ:AB:07:00 | FAM | HOME |
| SPEAKERS | X | | 99:98:MD:VA:01:02 | FAM | HOME |

*FIG. 5*

| WATCHLIST | |
|---|---|
| 49   SUBNETWORK INTERFACE | ENTER POWER SAVING MODE IF THERE IS A   50 CLIENT |
| ETHERNET | ENABLED |
| MoCA | ENABLED |
| USB | ENABLED |
| SSID FAM | ENABLED |
| SSID1_2.4G | |
| SSID2_2.4G | |
| SSID3_2.4G | ENABLED |
| SSID4_2.4G | |
| SSID1_5G | |
| SSID2_5G | |
| SSID3_5G | ENABLED |
| SSID4_5G | |

CONTROLLING A MODE OF OPERATION OF AN ELECTRONIC DEVICE

TECHNICAL FIELD

The subject matter of the present disclosure relates generally to controlling a mode of operation of an electronic device.

BACKGROUND

As part of a power reduction management protocol, cable modems have been known to constantly monitor the connection status of all interfaces of the modem, for example, Wi-Fi, Ethernet, Voice, and Multimedia over Coax Alliance (MoCA), as well as data traffic at each of the interfaces. When all of the interfaces are deactivated or data traffic at all of the interfaces is less than or equal to a predetermined threshold, cable modems enter Data Over Cable Service Interface Specification (DOCSIS) 1×1 power saving mode and/or Wi-Fi 1×1 power saving mode to reduce power consumption. The connection status and data traffic are also used to determine when to exit from the DOCSIS 1×1 power savings mode and/or Wi-Fi 1×1 power saving mode.

However, the software logic required to implement the Wi-Fi 1×1 and DOCSIS 1×1 power saving modes is complex and like most complex software inevitably includes bugs that can cause cable modems to incorrectly enter and/or exit the Wi-Fi 1×1 and/or DOCSIS 1×1 power saving modes or may prevent modems from entering or exiting the Wi-Fi 1×1 and/or DOCSIS 1×1 power savings modes. Additionally, the software logic typically does not consider low throughput performance requests on multiple server operators (MSO) service set identifiers (SSID) like hotspots and iControl services that may continue to operate while the cable modem is in the Wi-Fi 1×1 and/or DOCSIS 1×1 power saving modes. Also, users have no control over the timing of when the power saving mode is entered and/or exited, which can be inconvenient and frustrating for users. Therefore, known technologies for reducing power consumption of cable modems have clear drawbacks.

Thus, it would be advantageous and an improvement over the relevant technology to provide an apparatus, method, and computer-readable medium capable of properly entering and exiting the Wi-Fi 1×1 and/or DOCSIS 1×1 power saving modes at times convenient for users and that accommodate low throughput performance requests on MSO SSIDs like hotspots and iControl services.

SUMMARY

An aspect of the present disclosure provides an electronic device including a user interface, a network interface configured to connect to and communicate with local area network (LAN) clients and Wi-Fi clients, a non-transitory memory configured to store instructions, and a hardware processor. The hardware processor is configured to execute the instructions to monitor a connection status of the LAN clients and Wi-Fi clients connected to the network interface, and compare the connected LAN clients against a LAN client list and compare the connected Wi-Fi clients against a Wi-Fi client list. The LAN client list and the Wi-Fi client list are stored in the non-transitory memory.

The hardware processor is also configured to execute the instructions to control the mode of operation of the electronic device to be in a power savings mode when none of the connected LAN clients or none of the connected Wi-Fi clients are on the respective LAN or Wi-Fi client list, and to control the mode of operation of the electronic device to be in a normal power mode when any of the connected LAN clients or any of the connected Wi-Fi clients are on the respective LAN or Wi-Fi client list.

An aspect of the present disclosure provides a method for controlling a mode of operation of an electronic device including monitoring a connection status of local area network (LAN) clients and Wi-Fi clients connected to a network interface of the electronic device, and comparing the connected LAN clients against a LAN client list and comparing the connected Wi-Fi clients against a Wi-Fi client list. The LAN client list and the Wi-Fi client list are stored in a memory of the electronic device.

Moreover, the method includes controlling the mode of operation of the electronic device to be in a power savings mode when none of the connected LAN clients or none of the connected Wi-Fi clients are on the respective LAN or Wi-Fi client list, and controlling the mode of operation of the electronic device to be in a normal power mode when any of the connected LAN clients or any of the connected Wi-Fi clients are on the respective LAN or Wi-Fi client list.

An aspect of the present disclosure provides a non-transitory computer-readable recording medium in an electronic device for controlling the mode of operation of the electronic device. The non-transitory computer-readable recording medium stores instructions which when executed by a hardware processor performs the steps of the methods described above.

BRIEF DESCRIPTION OF THE DRAWINGS

In the drawings, like reference numbers generally indicate identical, functionally similar, and/or structurally similar elements.

FIGS. 3A, 3B, and 3C are exemplary Wi-Fi tables according to an embodiment of the present disclosure;

FIGS. 4A, 4B, and 4C are exemplary local area network (LAN) tables according to an embodiment of the present disclosure;

FIG. 5 is an exemplary Whitelist client table according to an embodiment of the present disclosure;

FIG. 6 is an exemplary Watchlist according to an embodiment of the present disclosure.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
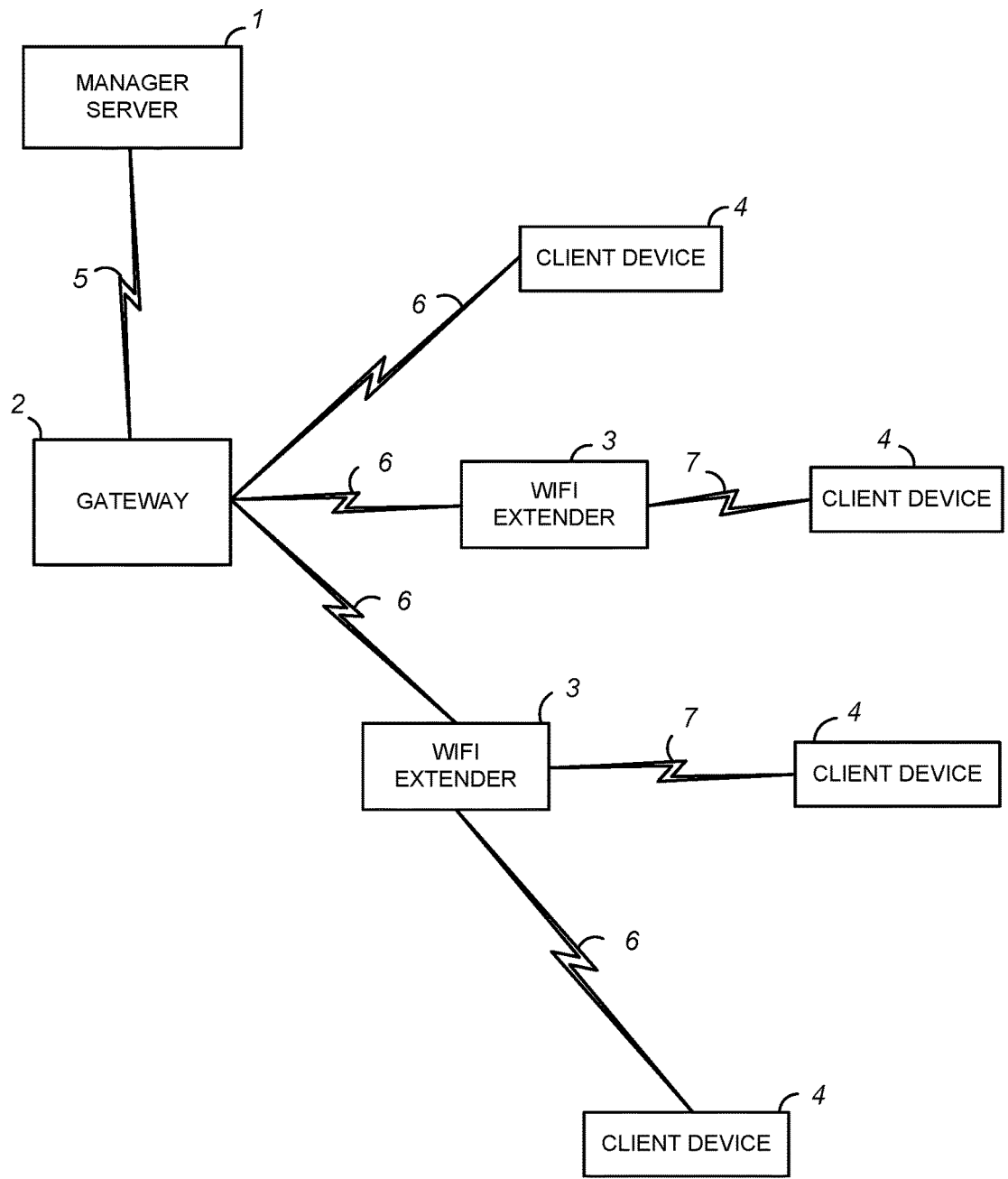
FIG. 1 is a schematic diagram illustrating an exemplary system for controlling a mode of operation of an electronic device.

FIG. 1 is a schematic diagram of an exemplary system for controlling a mode of operation of an electronic device. As shown in FIG. 1, the main elements of the system include a manager server 1 and a gateway device 2 connected to different wireless devices such as client devices 4 and wireless extenders 3.

The system shown in FIG. 1 includes wireless devices (e.g., extenders 3 and client devices 4) that may be connected in one or more wireless networks (e.g., private, guest, iControl, backhaul network, or Internet of things (IoT) networks) within the system. Each of the wireless networks may be referred to herein as a subnetwork (i.e., subnet). Additionally, there could be some overlap between devices in the different networks. That is, one or more network devices could be located in more than one network. For example, wireless extenders 3 could be located both in a private network for providing content and information to a client device and also included in a backhaul network.

Starting from the top of FIG. 1, the manager server 1 may be any type of server or network computer implemented as a management device for communicating, monitoring, and managing other devices (e.g., router, modems, switches, servers, gateway and other similar devices) connected in a network using a management protocol. For example, the manager server 1 can be a simple network management protocol (SNMP) management device implementing the use of an SNMP protocol. The SNMP protocol is an Internet standard protocol for collecting, organizing, and modifying information for the managed devices in the network. The managed devices (e.g., router, modems, switches, servers, gateway devices and other similar devices) by the manager server 1 would also support the use of the same or similar protocol such as the SNMP protocol.

By using a management protocol such as the SNMP protocol, the manager server 1 can send queries, receive responses, set variables, and monitor and acknowledge events with respect to the managed devices. The manager server 1 can implement the use of a management software or agent (e.g., NET-SNMP or MG-SOFT) for performing communicating, monitoring, and management functions related to the managed devices.

The connection 5 between the manager server 1 and the gateway device 2 can be implemented using a wide area network (WAN), a virtual private network (VPN), metropolitan area networks (MANs), system area networks (SANs), a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 5 can further include as some portion thereof a broadband mobile phone network connection, an optical network connection, or other similar connections. For example, the connection 5 can also be implemented using a fixed wireless connection that operates in accordance with, but is not limited to, 3rd Generation Partnership Project (3GPP) Long Term Evolution (LTE) or 5G protocols.

The gateway device 2 is a hardware electronic device that performs the function of a stand-alone cable modem or a combination modem and gateway device that combines the functions of a modem, access point, and/or a router for providing received content to network devices (e.g., client devices 4 and wireless extenders 3) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The gateway device 2 is connected to the wireless extenders 3 and client devices 4 via connection 6. The connection 6 between the gateway device 2 and the wireless extenders 3 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands.

Additionally, the connection 6 can be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connections 6 can include connections to a media over coax (MoCA) network. One or more of the connections 7 can also be a wired Ethernet connection.

The wireless extenders 3 are hardware electronic devices such as access points used to extend the wireless network by receiving the signals transmitted by the gateway device 2 and rebroadcasting the signals to client devices 4, which may be out of range of the gateway device 2. The wireless extenders 3 can also receive signals from the client devices 4 and rebroadcast the signals via the connection 6 to the gateway device 2, or other client devices 4.

The connection 7 between the wireless extenders 3 and the client devices 4 may be implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 7 may be implemented using a wireless connection that operates in accordance with, but is not limited to, IEEE 802.11 protocol, RF4CE protocol, ZigBee protocol, Z-Wave protocol, or IEEE 802.15.4 protocol. Also, one or more of the connections 7 can be a wired Ethernet connection.

The client devices 4 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the gateway device 2. Additionally, the client devices 4 can be a TV, an IP/QAM STB or an SMD that is capable of decoding audio/video content, and playing over OTT or MSO provided content received through the gateway device 2.

Figure 2:
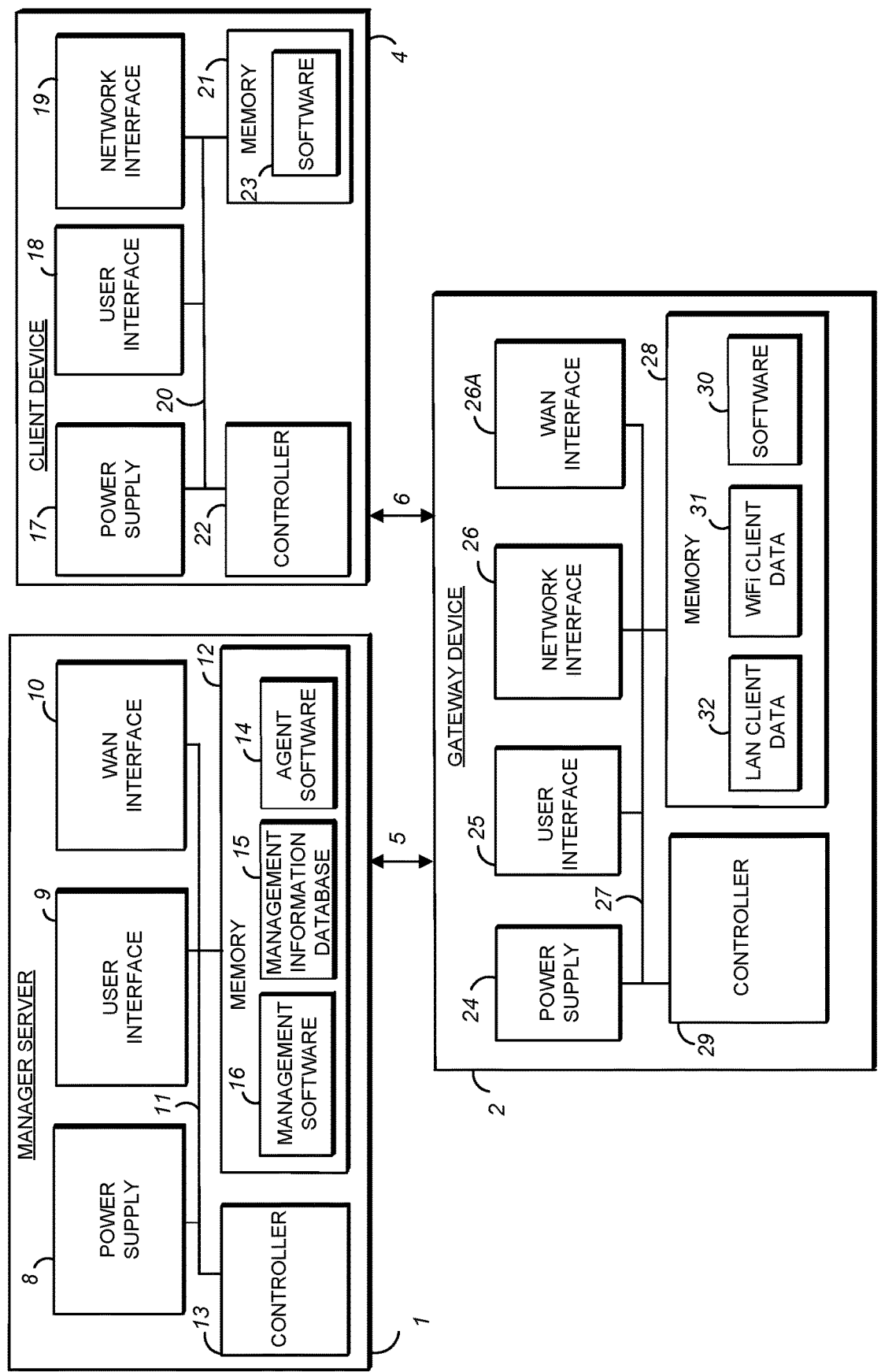
FIG. 2 is a more detailed schematic diagram illustrating an exemplary management server/PC 1, an exemplary gateway device 2, and an exemplary client device 4 in the system of FIG. 1.

A detailed description of the example internal components of the manager server 1, the gateway device 2, and the client devices 4 shown in FIG. 1 will be provided in the discussion of FIG. 2. However, in general, it is contemplated by the present disclosure that the manager server 1, gateway device 2, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium. In view of the above, the manager server 1, the gateway device 2, and the client devices 4 are considered to be electronic devices.

Further, any, all, or some of the computing devices in the manager server 1, the gateway device 2, and the client devices 4 may be adapted to execute any operating system, including Linux, UNIX, Windows, MacOS, DOS, and ChromeOS as well as virtual machines adapted to virtualize execution of a particular operating system, including customized and proprietary operating systems. The manager server 1, the gateway device 2, and the client devices 4 are further equipped with components to facilitate communication with other computing devices over the one or more network connections to local and wide area networks, wireless and wired networks, public and private networks, and any other communication network enabling communication in the system.

FIG. 2 illustrates a more detailed schematic diagram of an example manager server 1, an example gateway device 2, and an example client device 4 in the system for controlling a mode of operation of an electronic device according to an embodiment of the present disclosure. Although FIG. 2 shows one client device 4, the client device 4 in the figure is meant to be representative of the other client devices 4 shown in FIG. 1.

Similarly, the respective connections 5, 6 between the gateway device 2, the manager server 1, and the client device 4 shown in FIG. 2 are meant to be exemplary connections and are not meant to indicate all possible connections between the gateway devices 2, manager servers 1, and client devices 4. Additionally, it is contemplated by the present disclosure that the number of gateway devices 2, manager servers 1, wireless extenders 3, and client devices 4 is not limited to the number of gateway devices 2, manager servers 1, wireless extenders 3, and client devices 4 shown in FIGS. 1 and 2.

The gateway device 2 is a hardware electronic device that performs the function of a stand-alone cable modem or a combination modem and gateway device that combines the functions of a modem, access point and/or a router for providing received content to network devices (e.g., client devices and wireless extenders) in the system. It is also contemplated by the present disclosure that the gateway device 2 can include the function of, but is not limited to, an IP/QAM STB or SMD that is capable of decoding audio/video content, and playing OTT or MSO provided content. As shown in FIG. 2, the gateway device 2 includes a power supply 24, user interface 25, a network interface 26, a WAN interface 26A, a memory 28, and a controller 29.

The power supply 24 supplies power to the internal components of the gateway device 2 through the internal bus 27. The power supply 24 can be a self-contained power source such as a battery pack with an interface to be powered through an electrical charger connected to an outlet (e.g., either directly or by way of another device).

The user interface 25 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the gateway device 2.

The network interface 26 includes various network cards, and circuitry implemented in software and/or hardware to enable communications using the communication protocols of connection 6 (e.g., as previously described with reference to FIG. 1). The WAN interface 26A may include various network cards and circuitry implemented in software and/or hardware to enable communications between the gateway device 2 and the manager server 1 using communications protocols in accordance with connection 5 (e.g., as previously described with reference to FIG. 1).

The memory 28 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 28 can be used to store any type of data, for example, Wi-Fi client data 31, LAN client data 32, and data for low data usage devices which may be stored in any format, for example, in tabular form.

The Wi-Fi client data 31 and the LAN client data 32 may include data for both high and low data throughput devices. The gateway device 2 may access the Wi-Fi and LAN data in any manner. For example, the gateway device 2 may directly access the Wi-Fi client data 31 and the LAN client data 32. Alternatively, when the Wi-Fi client data 31 and the LAN client data 32 are stored in a database, the gateway device 2 may send a simple network management protocol (SNMP) query to the database requesting the Wi-Fi client data 31 and/or the LAN client data 32. The memory 28 may also store data regarding subnetworks connected to or that may be connected to the network interface 26.

Additionally, the memory 28 can be used to store software 30 including an application for controlling the modes of operation of the gateway device 2, and any other software 30 and/or any type of instructions associated with algorithms, processes, or operations for controlling the general functions and operations of the gateway device 2. For example, the application for controlling the modes of operation of the gateway device 2 may cause the gateway device 2 to enter a Wi-Fi 1×1 power saving mode and/or a Data Over Cable Service Interface Specification (DOCSIS) 1×1 power saving mode. The software 30 may also enable the gateway device 2 to support protocols such as a Simple Network Management Protocol (SNMP).

In the Wi-Fi 1×1 and DOCSIS 1×1 power saving modes the network interface 26 is not in an idle-state. Rather, the network interface 26 is able to provide low data traffic. For example, in the DOCSIS 1×1 power saving mode, the network interface 26 is able to provide 30M×15M data throughput where 30M and 15M indicate, respectively, that the network interface 26 is able to provide about 30 Megabits/second downstream throughput and 15 Megabits/second upstream throughput. The network interface 26 may also detect activity of Wi-Fi client devices and LAN clients.

The controller 29 controls the general operations of the gateway device 2 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 2. Communication between the components (e.g., 24-26A, 28, and 29) of the gateway device 2 is established using the internal bus 27.

The manager server 1 may be any type of server or network computer implemented as a management device for communicating, monitoring, and managing other devices (e.g., router, modems, switches, servers, gateway and other similar devices) connected in a network using a management protocol. For example, the manager server 1 can be a simple network management protocol (SNMP) management device implementing the use of an SNMP. The SNMP protocol is an Internet standard protocol for collecting, organizing, and modifying information for the managed devices in the network. The managed devices (e.g., router, modems, switches, servers, gateway and other similar devices) by the manager server 1 would also support the use of the same or similar protocol such as the SNMP protocol.

By using a management protocol such as the SNMP protocol, the manager server 1 can send queries, receive responses, set variables, and monitor and acknowledge events with respect to the managed devices. For example the manager server 1 may send queries to the gateway device 2 to obtain the Wi-Fi client data 31 and/or the LAN client data 32. The manager server 1 can implement the use of a management software or agent (e.g., NET-SNMP or MG-SOFT) for performing communicating, monitoring, and management functions related to the managed devices. As shown in FIG. 2, the manager server 1 includes a power supply 8, a user interface 9, a WAN interface 10, a memory 12, and a controller 13.

The power supply 8 supplies power to the internal components of the manager server 1 through the internal bus 11. The power supply 8 can be a self-contained power source such as a battery pack with an interface to be powered through an electrical charger connected to an outlet (e.g., either directly or by way of another device).

The user interface 9 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the manager server 1.

The WAN interface 10 may include various network cards and circuitry implemented in software and/or hardware to enable communications between the manager server 1 and the gateway device 2 using communications protocols in accordance with connection 5 (e.g., as previously described with reference to FIG. 1).

The memory 12 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 12 can be used to store any type of data, for example, management information data in a management information database 15, and any type of instructions including agent software 14 and management software 16, and any other software for controlling the general functions and operations of the manager server 1.

The controller 13 controls the general operations of the manager sever 1 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the manager server 1. Communication between the components (e.g., 8-10, 12, and 13) of the manager server 1 is established using the internal bus 11.

The client device 4 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the gateway device 2. As shown in FIG. 2, the client device 4 includes a power supply 17, user interface 18, network interface 19, a memory 21, and a controller 22.

The power supply 17 supplies power to the internal components of the client device 4 through an internal bus 20. The power supply 17 can be a self-contained power source such as a battery pack with an interface to be powered through an electrical charger connected to an outlet (e.g., either directly or by way of another device). The power supply 17 can also include a rechargeable battery that can be detached allowing for replacement such as NiCd, a NiMH, a Li-ion, or a Li-pol battery.

The user interface 18 includes, but is not limited to, push buttons, a keyboard, a keypad, an LCD, a TFT, an LED, an HD or other similar display device including a display device having touch screen capabilities so as to allow interaction between a user and the client device 4.

The network interface 19 includes various network cards, interfaces, and circuitry implemented in software and/or hardware to enable communications using the wireless protocols of connection 6 (e.g., as previously described with reference to FIG. 1).

The memory 21 includes a single memory or one or more memories or memory locations that include, but are not limited to a RAM, a DRAM, a memory buffer, a hard drive, a database, an EPROM, an EEPROM, a ROM, a flash memory, logic blocks of a FPGA, hard disk or any other various layers of memory hierarchy. The memory 21 can be used to store any type of data and any type of instructions and/or software 23 associated with algorithms, processes, or operations for controlling the general functions and operations of the client device 4.

The controller 22 controls the general operations of the client device 4 and includes, but is not limited to, a CPU, a hardware microprocessor, a multi-core processor, a single core processor, a FPGA, a microcontroller, an ASIC, a DSP, or other similar processing device capable of executing any type of instructions, algorithms, or software for controlling the operation and performing the functions of the client device 4. Communication between the components (e.g., 17-19, 21 and 22) of the client device 4 is established using the internal bus 20.

Gateway devices 2 are known to constantly monitor the connection status of all devices connected to the network interface 26, and when all of the interfaces are deactivated or data traffic at all of the interfaces is less than or equal to a predetermined threshold, gateway devices typically enter the Wi-Fi 1×1 or DOCSIS 1×1 power saving modes. However, the software logic required to implement the Wi-Fi 1×1 and DOCSIS 1×1 power saving modes is complex and like most complex software inevitably includes bugs which can cause incorrect entry to and/or exit from Wi-Fi 1×1 and/or DOCSIS 1×1 power saving modes. Additionally, the software logic typically does not consider low throughput performance requests on multiple server operators (MSO) service set identifiers (SSID) like hotspots and iControl services that may continue to operate while the cable modem in is the Wi-Fi 1×1 and/or DOCSIS 1×1 power saving modes.

To address these problems, the gateway device 2 of the present disclosure monitors the connection status of LAN clients and Wi-Fi clients connected to the network interface 26, compares the connected clients against respective LAN and Wi-Fi client tables, and based on the comparisons determines whether or not to enter a power savings mode or a normal power mode. For example, when none of the connected clients is included in a respective LAN or Wi-Fi client table, the gateway device 2 may enter a power savings mode and at the same time allow low data throughput clients to remain actively connected to the network interface 26.

FIG. 3A is an exemplary Wi-Fi client table 33 according to an embodiment of the present disclosure. The Wi-Fi client table 33 may be stored in the memory 28 of the gateway device 2 and includes a list of Wi-Fi client devices 34 and data for each Wi-Fi client device 34. FIG. 3A shows only one exemplary Wi-Fi client table 33 stored in the memory 28. However, it is contemplated by the present disclosure that there could be one or more Wi-Fi client tables 33 stored in the memory 28. The Wi-Fi client devices 34 include, but are not limited to, a Wi-Fi-CPE5 router, a laptop computer, a smartphone, a tablet computer, and a TV. The present disclosure contemplates that the home Wi-Fi client table 33 may additionally, or alternatively, include any type and number of Wi-Fi client devices 34.

Data for each Wi-Fi client device 34 may include, but is not limited to, a connection status 35, a Media Access Control (MAC) address 36, and a Service Set Identifier (SSID) 37. The connection status 35 is either connected or disconnected. As used herein, a connected connection status is intended to indicate that data may be communicated between the gateway device 2 and another device. Such other devices may include, for example, a Wi-Fi client device 34, a LAN client, and/or a low data throughput client. A disconnected connection status is intended to indicate that data may not be communicated between the gateway device 2 and another device, for example, a Wi-Fi client device 34, a LAN client, and/or a low data throughput client. According to the Wi-Fi client table 33, all of the Wi-Fi client devices 34 are connected to the gateway device 2 except for the laptop computer.

A MAC address is a unique identifier of a device that is used as a network address in communications within a network. Each of the Wi-Fi client devices 34 has a unique MAC address 36 which includes six groups of two hexadecimal digits. For example, the unique MAC address 36 for the smartphone is F2:36:B2:14:R1:45.

The SSID 37 for each Wi-Fi client device 34 is FAM, which is the home Wi-Fi subnetwork. Because the SSID of each Wi-Fi client device 34 is FAM, it should be understood that the connection status of client devices 34 on the home Wi-Fi subnetwork are monitored. The Wi-Fi client table 33 includes Wi-Fi devices 34 having high data throughput. It should be understood that high data throughput devices are responsible for much of the gateway device's power consumption.

The information shown in FIGS. 3B and 3C is the same information shown in FIG. 3A as described in more detail below. As such, features illustrated in FIGS. 3B and 3C that are identical to features illustrated in FIG. 3A are identified using the same reference numerals used in FIG. 3A.

FIG. 3B is the Wi-Fi client table 33 illustrated in FIG. 3A; however, all of the Wi-Fi client devices 34 are disconnected. It is contemplated by the present disclosure that the gateway device 2 does not enter the Wi-Fi 1×1 power saving mode unless all of the Wi-Fi client devices 34 become disconnected. As a result, the gateway device 2 enters the Wi-Fi 1×1 power saving mode when all of the Wi-Fi devices 34 are disconnected as shown in the Wi-Fi client table 33 illustrated in FIG. 3B.

It is contemplated by the present disclosure that in the Wi-Fi 1×1 power saving mode the network interface 26 can still provide for low data traffic. The gateway device 2 does not immediately enter the Wi-Fi 1×1 power saving mode. Rather, it is contemplated by the present disclosure that the gateway device 2 enters the Wi-Fi 1×1 power saving mode a predetermined time, for example, fifteen minutes, after the time of the most recent Wi-Fi client device 34 disconnection. Alternatively, the predetermined time may be any period of time that prevents entry into the Wi-Fi 1×1 power savings mode so frequently that users are inconvenienced.

If a Wi-Fi client device 34 becomes connected to the gateway device 2 while the gateway device 2 is in the Wi-Fi 1×1 power saving mode, the gateway device 2 immediately exits the Wi-Fi 1×1 power saving mode and enters a normal power mode. The normal power mode is referred to herein as a Wi-Fi M×N full antenna mode, where M is a number of transmitting antennas (i.e., results in M inputs) and N is a number of receiving antennas (i.e., results in N outputs). The gateway device 2 immediately exits the Wi-Fi 1×1 power saving mode and enters the normal power mode because waiting a predetermined period of time would inconvenience and frustrate users.

FIG. 3C is the exemplary Wi-Fi client table 33 illustrated in FIG. 3B and includes additional Wi-Fi client devices 34 and a subnetwork 37A for each client device 34. The additional client devices 34 are a second smartphone and an unknown device that each connects to a different Wi-Fi subnetwork. The unknown device is a device for which information was not received by the gateway device 2. Most of the client devices 34 connect to the home Wi-Fi subnetwork 37A. However, the second smartphone connects to the guest Wi-Fi subnetwork 37A which has an SSID of "friend," and the unknown device connects to the IoT Wi-Fi subnetwork which has an SSID of "gadget."

It is contemplated by the present disclosure that any number and type of Wi-Fi client devices 34 may be included in the table 33, and that any of the Wi-Fi client devices 34 may connect to any Wi-Fi subnetwork, not only the home Wi-Fi subnetwork. The other Wi-Fi subnetworks may connect to the network interface 26 of the gateway device 2. As a result, users of the gateway device 2 may configure the Wi-Fi client table 33 to include any type of Wi-Fi client device 34 that connects to any Wi-Fi subnetwork within range of the gateway device 2 that suits him or her.

Users may also configure the gateway device 2 to enter the Wi-Fi 1×1 power saving mode when any number of the Wi-Fi client devices 34 become disconnected. For example, the gateway device 2 may be configured to enter the Wi-Fi 1×1 power saving mode when all of the Wi-Fi client devices 34 become disconnected or when all but one of the Wi-Fi client devices 34 become disconnected. In view of the above, it can be seen that users are enabled to control the timing of when the gateway device 2 enters and exits the Wi-Fi 1×1 power saving mode.

FIG. 4A is an exemplary local area network (LAN) client table 38 according to an embodiment of the present disclosure. The LAN client table 38 may be stored in the memory 28 of the gateway device 2 and includes a list of LAN clients 39 and data for each LAN client 39. FIG. 4A shows only one exemplary LAN client table 38 stored in the memory 28. However, it is contemplated by the present disclosure that there could be one or more LAN client tables 38 stored in the memory 28.

The LAN clients 39 include, but are not limited to, an Ethernet cable, a MoCA cable, a Universal Serial Bus (USB) device, and the home Wi-Fi network. The present disclosure contemplates that the LAN client table 38 may additionally, or alternatively, include any type and number of LAN clients 39. The Ethernet cable, the MoCA cable, and the USB are devices that physically connect to the gateway device 2.

Data corresponding to each LAN client 39 may include, but is not limited to a connection status 40, a Media Access Control (MAC) address 41, a Service Set Identifier (SSID) 42, and a subnetwork 42A. The connection status 40 is either connected or disconnected. According to the LAN client table 38, all of the LAN clients 39 are connected to the gateway device 2 except for the MoCA cable.

Similar to the MAC addresses 36 described herein with regard to FIG. 3A, the MAC address 41 is a unique identifier of a device that is used as a network address in communications within a network. Each of the Ethernet clients 39 has a unique MAC address 41 which includes six groups of two hexadecimal digits. For example, the unique MAC address 41 for the Ethernet cable is 00:00:AA:00:00:01.

The SSID 42 identifies the respective Wi-Fi subnetworks that are connected to the gateway device 2. For example, the SSID 42 of the home Wi-Fi subnetwork is FAM. The Ethernet cable, MoCA, and USB device are not Wi-Fi subnetworks so do not have an SSID 42. The Ethernet cable, MoCA and USB device are associated with high data throughput demands of devices so are also responsible for much of the gateway device's power consumption.

The subnetwork 42A is the subnetwork used by each LAN client 39 to connect to the gateway device 2. For example, the Ethernet cable and the MoCA cable connect to the gateway device 2 using the backhaul subnetwork 42A, while the USB device connects to the gateway device 2 using the guest subnetwork 42A. The Wi-Fi client connects to the gateway device 2 using the home subnetwork 42A.

The information shown in FIGS. 4B and 4C is the same information shown in FIG. 4A as described in more detail below. As such, features illustrated in FIGS. 4B and 4C that are identical to features illustrated in FIG. 4A are identified using the same reference numerals used in FIG. 4A.

FIG. 4B is the exemplary LAN client table 38 illustrated in FIG. 4A; however, all of the LAN clients 39 are disconnected. It is contemplated by the present disclosure that when all of the LAN clients 39 become disconnected, the gateway device 2 enters the DOCSIS 1×1 power saving mode. As a result, the gateway device 2 enters the DOCSIS 1×1 power saving mode when all of the LAN clients 39 are disconnected as shown in the LAN client table 38 illustrated in FIG. 4B.

It is contemplated by the present disclosure that in the DOCSIS 1×1 power saving mode the network interface 26 is able to provide low data traffic. For example, the network interface 26 is able to provide 30M×15M data throughput.

Similar to entering the Wi-Fi 1×1 power saving mode, the gateway device 2 waits a predetermined period of time, for example fifteen minutes, before entering the DOCSIS 1×1 power saving mode. When any one of the LAN clients 39 connects to the gateway device 2 while the gateway device 2 is in the DOCSIS 1×1 power saving mode, the gateway device 2 immediately exits the DOCSIS 1×1 power saving mode and enters the normal power mode. The normal power mode is referred to herein as the full DOCSIS M×N bonding mode, where M is the number of transmitting antennas (i.e., result in M inputs) and N is the number of receiving antennas (i.e., results in N outputs). The gateway device 2 does not wait a predetermined period of time before entering the full DOCSIS M×N bonding mode because doing so would be inconvenient and frustrating for users.

It is contemplated by the present disclosure that the LAN client table 38 may also be used to determine whether or not to enter the Wi-Fi 1×1 power saving mode. As shown in FIG. 4B, the home Wi-Fi subnetwork 42A is disconnected. As described herein with regard to FIGS. 3A-3C, the home Wi-Fi subnetwork becomes disconnected when all of the Wi-Fi client devices 34 are disconnected from the home Wi-Fi subnetwork and as a result the gateway device 2 enters the Wi-Fi 1×1 power saving mode. Consequently, the disconnected status of the home Wi-Fi subnetwork as shown in FIG. 4B may alternatively be used to determine that the gateway device 2 should enter the Wi-Fi 1×1 power saving mode.

In view of the above, it should be understood that the gateway device 2 may simultaneously be in the Wi-Fi 1×1 power saving mode and the DOCSIS 1×1 power saving mode. Additionally, it should be understood that the gateway device 2 may be in the Wi-Fi 1×1 power saving mode after entering full DOCSIS M×N bonding mode. However, the gateway device 2 cannot be in the DOCSIS 1×1 power saving mode while also in the Wi-Fi M×N full antenna mode FIG. 4C is the exemplary LAN client table 38 illustrated in FIG. 4B including additional LAN clients 39. The additional LAN clients 39 are second and third Wi-Fi subnetworks, Wi-Fi-2 and Wi-Fi-3, respectively. The SSID 42 of the second and third Wi-Fi subnetworks Wi-Fi-2 and Wi-Fi-3, respectively, are friend and gadget. The second Wi-Fi subnetwork uses the guest subnetwork 42A to connect to the gateway device 2 while the third Wi-Fi subnetwork uses the IoT subnetwork 42A to connect to the gateway device 2.

Similar to the Wi-Fi client device table 33, it is contemplated by the present disclosure that any number and type of LAN clients 39 may be included in the table 38. As a result, users of the gateway device 2 may configure the LAN client table 38 to include any number and type of LAN client 39 that suits him or her.

Users may also configure the gateway device 2 to enter the DOCSIS 1×1 power saving mode when any number of LAN clients 39 become disconnected. For example, the gateway devices 2 may be configured to enter the DOCSIS 1×1 power saving mode when all of the LAN clients 39 become disconnected or when all but one LAN client device 39 become disconnected. In view of the above, it can be seen that users are enabled to control the timing of when the gateway device 2 enters and exits the DOCSIS 1×1 power saving mode.

FIG. 5 is an exemplary whitelist client table 43 according to an embodiment of the present disclosure. The whitelist client table 43 may be stored in the memory 28 of the gateway device 2 and includes a list of clients 44 and data for each client 44. FIG. 5 shows only one exemplary whitelist client table 43 stored in the memory 28. However, it is contemplated by the present disclosure that there could be one or more whitelist client table 43 stored in the memory 28.

The clients 44 include intelligent low data throughput devices including, but not limited to, an air conditioner, a thermostat, a refrigerator, and speakers. The present disclosure contemplates that the whitelist client table 43 may additionally, or alternatively, include any type and number of intelligent low data throughput clients 44.

Data for each client device 44 may include, but is not limited to a connection status 45, a MAC address 46, a SSID 47, and a subnetwork 42A. The connection status 45 is either connected or disconnected. According to the white client table 43 all of the clients 44 have a connected connection status.

The SSID 47 for each client 44 is the home Wi-Fi subnetwork. The home Wi-Fi subnetwork may be used by Wi-Fi client devices 34 that have high data throughput and clients 44 having low data throughput. The gateway device 2 uses little energy to connect to the low data throughput clients 44. Thus, it is contemplated by the present disclosure that when the gateway device 2 is in the Wi-Fi 1×1 and/or DOCSIS 1×1 power saving modes, the gateway device 2 may continue to connect to the low data throughput clients 44.

The whitelist client table 43 may also be used to determine when the gateway device 2 should enter the Wi-Fi 1×1 and DOCSIS 1×1 power saving modes. When low data throughput clients 44 only are connected with the gateway device 2, it implies that the connection status of all of the Wi-Fi client devices 34 and LAN clients 39 is disconnected. As a result, the gateway device 2 may enter the Wi-Fi 1×1 and DOCSIS 1×1 power saving modes when low data throughput clients 44 only are connected.

Many electronic toys used by children are low data throughput devices that may be included in the white client list 43. Thus, when the gateway device 2 enters the Wi-Fi 1×1 and DOCSIS 1×1 power saving modes, the gateway device 2 may continue to be connected to the electronic toys so children may continue to play with them.

FIG. 6 is an exemplary Watchlist 48 according to an embodiment of the present disclosure. The Watchlist 48 may be stored in the memory 28 of the gateway device 2 and includes a list of subnetwork interfaces 49 and an enabled status corresponding to each subnetwork interface 49 being monitored by the gateway device 2. FIG. 6 shows only one exemplary Watchlist 48 stored in the memory 28. However, it is contemplated by the present disclosure that there could be one or more Watchlist 48 stored in the memory 28.

Each enabled subnetwork interface 49 is monitored to determine if any clients are connected to the respective subnetwork. If any clients are connected, the gateway device 2 may enter or remain in the Wi-Fi 1×1 and/or DOCSIS 1×1 power saving modes.

The Watchlist 48 is configurable. More specifically, users may select subnetwork interfaces 49 for monitoring by assigning an enabled status to a subnetwork interface 49. For example, a user may assign an enabled status to the subnetwork interface SSID2_2.4G to select subnetwork interface SSID2_2.4G for monitoring. Users may similarly remove an enabled status so a subnetwork interface is not monitored. Thus, it should be understood that the Watchlist 48 may be configured by users to add and/or cancel subnetwork interfaces 49 to be monitored. The subnetwork interfaces 49 are monitored by the network interface 26 of the gateway device 2.

Figure 7:
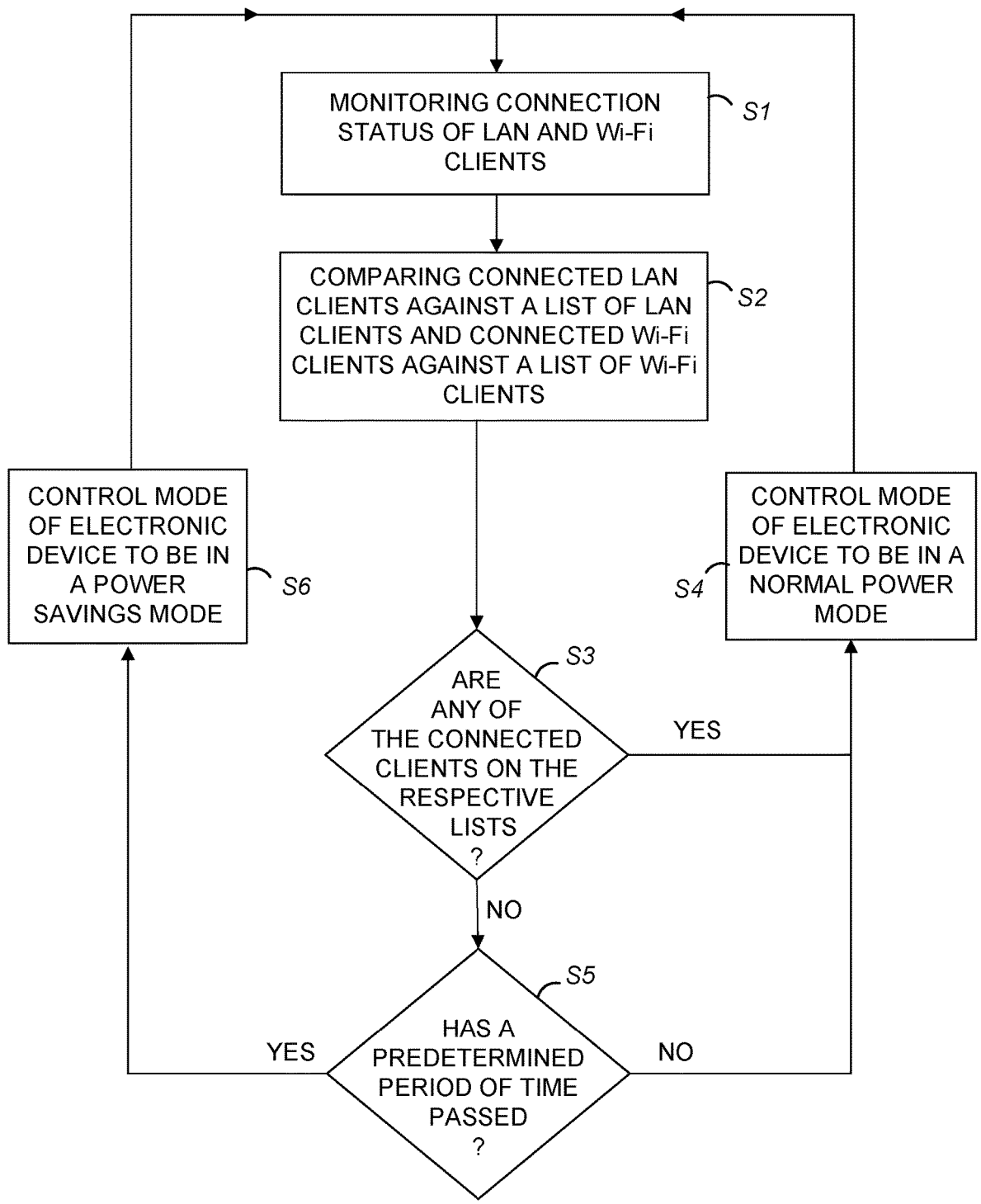
FIG. 7 is an exemplary method and algorithm for controlling a mode of operation of an electronic device.

FIG. 7 is an exemplary method and algorithm for controlling a mode of operation of the gateway device 2 in accordance with an embodiment of the present disclosure. FIG. 7 illustrates exemplary operations performed for monitoring the connection status of Wi-Fi clients, LAN clients, and low data throughput clients, as well as operations performed for determining when to enter and exit a power saving mode. The exemplary method and algorithm of FIG. 7 includes operations that may be performed by the software 30 executed by the controller 29 of the gateway device 2, the software 14 and/or 16 executed by the controller 13 of the manager server 1, and the software 23 executed by the controller 21 of the client device 4.

In step S1, the software 30 executed by the controller 29 causes the gateway device 2 to monitor the connection status of clients connected to the network interface 26. Alternatively, the software 14 and/or 16 executed by the controller 13 may cause the manager server 1 to monitor the connection status of the clients connected to the network interface 26 and to communicate the connection status of the connected clients to the gateway device 2 using the WAN interface 10 and connection 5.

The connection status of the clients is either connected or disconnected. As used herein, a connected connection status is intended to indicate that data may be communicated between the gateway device 2 and another device. Such other devices may include for example, a Wi-Fi client device 34, a LAN client 39, and/or a low data throughput client 44. A disconnected connection status is intended to indicate that data may not be communicated between the gateway device 2 and another device, for example, a Wi-Fi client device 34, a LAN client 39, and/or a low data throughput client 44.

In step S2, the software 30 executed by the controller 29 causes the gateway device 2 to access the Wi-Fi client data 31, the LAN client data 32, and data for low throughput clients stored in the memory 28 of the gateway device 2. Additionally, the gateway device compares any connected LAN clients against the LAN client data 32 listed in the LAN client table 38. Likewise, the gateway device 2 compares any connected Wi-Fi client devices against the Wi-Fi client device data 31 listed in the Wi-Fi client table 33.

In step S3, the software 30 executed by the controller 29 causes the gateway device 2 to determine whether or not any of the connected Wi-Fi client devices is in the Wi-Fi client table 33 and whether or not any of the connected LAN clients is in the LAN client table 38. If any of the connected Wi-Fi client devices 34 is in the Wi-Fi client table 33 or any of the connected LAN clients is in the LAN client table 38, in step S4, the software 30 executed by the controller 29 causes the mode of operation of the gateway device 2 to remain in a normal power mode.

However, if none of the connected Wi-Fi client devices is in the Wi-Fi client table 33 and none of the connected LAN clients is in the LAN client table 38, in step S5, the software 30 executed by the controller 29 causes the gateway device 2 to determine the elapsed time since the most recent client disconnection and whether or not a predetermined period of time has passed since the most recent disconnection. The period of time may be any period of time, for example fifteen minutes, that facilitates preventing entry into the power savings mode so frequently that users are inconvenienced.

When the predetermined period of time has not passed, in step S4, the software 30 executed by the controller 29 causes the mode of operation of the gateway device 2 to remain in a normal power mode. However, when the predetermined period of time has passed, in step S6, the software 30 executed by the controller 29 causes the mode of operation of the gateway device 2 to be in a power saving mode. The power saving mode includes simultaneously implementing the Wi-Fi 1×1 and DOCSIS 1×1 power saving modes.

Although the method and algorithm for controlling a mode of operation of the gateway device 2 describes simultaneously implementing the Wi-Fi 1×1 and DOCSIS 1×1 power saving modes, it is contemplated by the present disclosure that the Wi-Fi 1×1 power saving mode may be implemented separately from the DOCSIS 1×1 power saving mode. For example, when the LAN client table 38 indicates that the Wi-Fi network HOME is disconnected and at least one other LAN client in the LAN client table 38 is connected, the software 30 executed by the controller 29 may cause the mode of operation of the gateway device 2 to be in the Wi-Fi 1×1 power saving mode but not the DOCSIS 1×1 power saving mode. Alternatively, the Wi-Fi client device table 33 may be used to determine whether the Wi-Fi network HOME is disconnected. When none of the LAN clients in the LAN client table 38 is connected, the software 30 executed by the controller 29 may cause the mode of operation of the gateway device 2 to also be in the DOCSIS 1×1 power saving mode.

The method and algorithm for controlling a mode of operation of the gateway device 2 facilitates simplifying entry into the power saving mode, facilitates users to control entry into the power savings mode, and facilitates enabling the gateway device 2 to provide service to low data usage clients while in power savings mode.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIG. 7. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. An electronic device comprising:
a user interface;
a network interface configured to connect to and enable communication with local area network (LAN) clients and Wi-Fi clients;
a non-transitory memory having instructions stored thereon; and
a hardware processor configured to execute the instructions to:
monitor a connection status of the LAN clients and Wi-Fi clients connected to the network interface;
compare the connected LAN clients against a LAN client list and compare the connected Wi-Fi clients against a Wi-Fi client list, the LAN client list and the Wi-Fi client list being stored in the non-transitory memory;
control a mode of operation of the electronic device to be in a power savings mode when none of the connected LAN clients or none of the connected Wi-Fi clients are on the respective LAN or Wi-Fi client list; and
control the mode of operation of the electronic device to be in a normal power mode when any of the connected LAN clients or any of the connected Wi-Fi clients are on the respective LAN or Wi-Fi client list.

2. The electronic device according to claim 1, wherein the hardware processor further executes the instructions to:
control the mode of operation to implement a Wi-Fi 1×1 antenna mode when none of the connected Wi-Fi clients is included on the Wi-Fi client list, wherein each Wi-Fi client is connected to the network interface based on one of a plurality of subnetwork service set identifiers; and
control the mode of operation to implement a DOCSIS 1×1 bonding mode when none of the connected LAN clients is included on the LAN client list, wherein each LAN client is connected to the network interface using one of a plurality of subnetworks.

3. The electronic device according to claim 1, wherein the hardware processor further executes the instructions to:
control the mode of operation to be in a Wi-Fi normal power mode when any of the connected Wi-Fi clients is included on the Wi-Fi client list, wherein each Wi-Fi client is connected to the network interface based on one of a plurality of network service set identifiers; and
control the mode of operation to be in a DOCSIS normal power mode when any of the connected LAN clients is included on the LAN client list, wherein each LAN client is connected to the network interface using one of a plurality of subnetworks.

4. The electronic device according to claim 1, wherein the normal power mode includes a Wi-Fi normal power mode and a DOCSIS normal power mode, the Wi-Fi normal power mode being a Wi-Fi M×N full antenna mode and the DOCSIS normal power mode being a DOCSIS M×N bonding mode, where M is a number of transmitting antennas and N is a number of receiving antennas.

5. The electronic device according to claim 1, wherein the hardware processor executes the instructions to control the mode of operation of the electronic device to be in the power savings mode a predetermined time after the connected LAN clients are compared against a LAN client list and the connected Wi-Fi clients are compared against a Wi-Fi client list.

6. The electronic device according to claim 1, wherein the hardware processor further executes the instructions to:
create a Whitelist of LAN and Wi-Fi clients that are able to be connected to the network interface while the mode of operation of the electronic device is controlled to be in the power saving mode; and
compare the connected LAN clients and the connected Wi-Fi clients against the LAN clients and Wi-Fi clients, respectively, included on the Whitelist.

7. The electronic device according to claim 1, wherein the hardware processor further executes the instructions to:
create a configurable Watchlist of subnetworks able to be connected to the network interface; and
monitor a subnetwork on the Watchlist that is connected to the network interface, wherein the mode of operation of the electronic device is controlled to be in the power saving mode when a client is connected to the monitored subnetwork.

8. A method for controlling a mode of operation of an electronic device comprising:
monitoring a connection status of local area network (LAN) clients and Wi-Fi clients connected to a network interface of the electronic device;
comparing the connected LAN clients against a LAN client list and comparing the connected Wi-Fi clients against a Wi-Fi client list, the LAN client list and the Wi-Fi client list being stored in a memory of the electronic device;
controlling the mode of operation of the electronic device to be in a power savings mode when none of the connected LAN clients or none of the connected Wi-Fi clients are on the respective LAN or Wi-Fi client list; and
controlling the mode of operation of the electronic device to be in a normal power mode when any of the connected LAN clients or any of the connected Wi-Fi clients are on the respective LAN or Wi-Fi client list.

9. The method according to claim 8, wherein the controlling the mode of operation of the electronic device to be in a power savings mode comprises:
controlling the mode of operation to implement a Wi-Fi 1×1 antenna mode when none of the connected Wi-Fi clients is included on the Wi-Fi client list, wherein each Wi-Fi client is connected to the network interface based on one of a plurality of network service set identifiers; and
controlling the mode of operation to implement a DOCSIS 1×1 bonding mode when none of the connected LAN clients is included on the LAN client list, wherein each LAN client is connected to the network interface using one of a plurality of subnetworks.

10. The method according to claim 8, wherein the controlling the mode of operation of the electronic device to be in a normal power mode comprises:
controlling the mode of operation to be in a Wi-Fi normal power mode when any of the connected Wi-Fi clients is included on the Wi-Fi client list, wherein each Wi-Fi client is connected to the network interface based on one of a plurality of network service set identifiers; and
controlling the mode of operation to be in a DOCSIS normal power mode when any of the connected LAN clients is included on the LAN client list, wherein each LAN client is connected to the network interface using one of a plurality of subnetworks.

11. The method according to claim 8, wherein the normal power mode includes a Wi-Fi normal power mode and a DOCSIS normal power mode, the Wi-Fi normal power mode being a Wi-Fi M×N full antenna mode and the DOCSIS normal power mode being a DOCSIS M×N bonding mode, where M is a number of transmitting antennas and N is a number of receiving antennas.

12. The method according to claim 8 wherein the controlling the mode of operation of the electronic device to be in the power savings mode occurs a predetermined time after the connected LAN clients are compared against a LAN client list and connected Wi-Fi clients are compared against a Wi-Fi client list.

13. The method according to claim 8 further comprising:
creating a whitelist of LAN and Wi-Fi clients that are able to be connected to the network interface of the electronic device while the mode of operation of the electronic device is controlled to be in the power saving mode; and
comparing the connected LAN clients and the connected Wi-Fi clients against the LAN clients and Wi-Fi clients, respectively, included on the whitelist.

14. The method according to claim 8, further comprising:
creating a configurable Watchlist of subnetworks able to be connected to the network interface; and
monitoring a subnetwork on the Watchlist that is connected to the network interface, wherein the mode of operation of the electronic device is controlled to be in the power saving mode when a client is connected to the monitored subnetwork.

15. A non-transitory computer-readable recording medium in an electronic device for controlling modes of operation of the electronic device, the non-transitory computer-readable recording medium storing instructions which when executed by a hardware processor performs steps comprising:
monitoring a connection status of local area network (LAN) clients and Wi-Fi clients connected to a network interface of the electronic device;
comparing the connected LAN clients against a LAN client list and comparing the connected Wi-Fi clients against a Wi-Fi client list, the LAN client list and the Wi-Fi client list being stored in a memory of the electronic device;

controlling the mode of operation of the electronic device to be in a power savings mode when none of the connected LAN clients or none of the connected Wi-Fi clients are on the respective LAN or Wi-Fi client list; and controlling the mode of operation of the electronic device to be in a normal power mode when any of the connected LAN clients or any of the connected Wi-Fi clients are on the respective LAN or Wi-Fi client list.

16. The non-transitory computer-readable recording medium according to claim 15, wherein the hardware processor further executes the instructions to perform steps comprising:

controlling the mode of operation to implement a Wi-Fi 1×1 antenna mode when none of the connected Wi-Fi clients is included on the Wi-Fi client list, wherein each Wi-Fi client is connected to the network interface based on one of a plurality of network service set identifiers; and controlling the mode of operation to implement a DOCSIS 1×1 bonding mode when none of the connected LAN clients is included on the LAN client list, wherein each LAN client is connected to the network interface using one of a plurality of subnetworks.

17. The non-transitory computer-readable recording medium according to claim 15, the hardware processor further executes the instructions to perform steps comprising:

controlling the mode of operation to be in a Wi-Fi normal power mode when any of the connected Wi-Fi clients is included on the Wi-Fi client list, wherein each Wi-Fi client is connected to the network interface based on one of a plurality of network service set identifiers; and controlling the mode of operation to be in a DOCSIS normal power mode when any of the connected LAN clients is included on the LAN client list, wherein each LAN client is connected to the network interface using one of a plurality of subnetworks.

18. The non-transitory computer-readable recording medium according to claim 15, wherein the normal power mode includes a Wi-Fi normal power mode and a DOCSIS normal power saving mode, the Wi-Fi normal power mode being a Wi-Fi M×N full antenna mode and the DOCSIS normal power mode being a DOCSIS M×N bonding mode, where M is a number of transmitting antennas and N is a number of receiving antennas.

19. The non-transitory computer-readable recording medium according to claim 15, wherein the hardware processor executes the instructions to control the mode of operation of the electronic device to be in a power savings mode a predetermined time after the connected LAN clients are compared against a LAN client list and the connected Wi-Fi clients are compared against a Wi-Fi client list.

20. The non-transitory computer-readable recording medium according to claim 15, wherein the hardware processor further executes the instructions to perform steps comprising:

creating a whitelist of LAN and Wi-Fi clients that are able to be connected to the network interface of the electronic device while the mode of operation of the electronic device is controlled to be in the power saving mode; and comparing the connected LAN clients and the connected Wi-Fi clients against the LAN clients and Wi-Fi clients, respectively, included on the whitelist.

21. The non-transitory computer-readable recording medium according to claim 15, further comprising:

creating a configurable Watchlist of subnetworks able to be connected to the network interface; and monitoring a subnetwork on the Watchlist that is connected to the network interface, wherein the mode of operation of the electronic device is controlled to be in the power saving mode when a client is connected to the monitored subnetwork.

* * * * *